(12) United States Patent
Matsuzaki

(10) Patent No.: US 7,160,468 B2
(45) Date of Patent: Jan. 9, 2007

(54) COOLING SYSTEM FOR FUEL CELL AND PREVENTION METHOD FOR DEGRADATION OF COOLANT THEREFOR

(75) Inventor: Tsutomu Matsuzaki, Sano (JP)

(73) Assignee: Calsonic Kansei Corporation (JP)

( * ) Notice: Subject to any disclaimer, the term of this patent is extended or adjusted under 35 U.S.C. 154(b) by 0 days.

(21) Appl. No.: 10/806,587

(22) Filed: Mar. 23, 2004

(65) Prior Publication Data

US 2004/0191586 A1    Sep. 30, 2004

(30) Foreign Application Priority Data

Mar. 28, 2003    (JP) ............................ 2003-090222

(51) Int. Cl.
*B01D 15/00* (2006.01)
*H01M 8/06* (2006.01)

(52) U.S. Cl. ............... 210/694; 210/805; 210/181; 210/196; 210/251; 429/17; 429/20

(58) Field of Classification Search ............... 210/679, 210/694, 767, 805, 196, 198.1, 181, 251; 429/13, 17, 19, 20, 26
See application file for complete search history.

(56) References Cited

U.S. PATENT DOCUMENTS

| 6,376,113 B1 * | 4/2002 | Edlund et al. | 429/19 |
| 6,428,916 B1 * | 8/2002 | Grasso et al. | 429/13 |

FOREIGN PATENT DOCUMENTS

| EP | 1 296 396 A | 3/2003 |
| GB | 1 221 536 A | 2/1971 |
| JP | 2001-167782 | 6/2001 |
| WO | WO 00/17951 A | 3/2000 |
| WO | WO 01/47052 A | 6/2001 |
| WO | WO 02/063707 A | 8/2002 |

* cited by examiner

*Primary Examiner*—Ivars C. Cintins
(74) *Attorney, Agent, or Firm*—Kilpatrick Stockton LLP

(57) ABSTRACT

A cooling system for a fuel cell system is provided with a circulation system including a circulation pump for circulating coolant, the coolant essentially consisting of water and glycol, a fuel cell connected to the circulation system so as to be cooled by the coolant, a heat exchanger connected to the circulation system so as to radiate heat from the coolant and a filter connected to the circulation system and configured to remove oxidation reaction product of the glycol from the coolant.

4 Claims, 2 Drawing Sheets

COOLING SYSTEM FOR FUEL CELL AND PREVENTION METHOD FOR DEGRADATION OF COOLANT THEREFOR

BACKGROUND OF THE INVENTION

1. Field of the Invention

The present invention relates to a cooling system for cooling coolant which circulates through and cools a fuel cell and, more specifically, to a cooling system provided with a prevention system for preventing degradation of the coolant and a method thereof.

2. Description of the Related Art

Fuel cells are clean energy power source and application of the fuel cells to batteries for electric vehicles is now diligently being developed. For example, a fuel cell system of apolyelectrolyte type has been proposed. The fuel cell system is configured to protonate hydrogen in the fuel cell stack as a fuel by means of a protonating catalyst supported by the polyelectrolyte and produce reaction of oxygen existing on the other side of the polyelectrolyte thereupon so as to generate electric power. Namely, the fuel cell system is a kind of power generators utilizing electrochemical reaction.

The fuel cell system produces heat accompanying the reaction so that a temperature thereof tends to rise though there is a proper temperature range. Thereby the fuel cell system is necessarily provided with a cooling system for circulating coolant having a predetermined temperature (about 65 through 70 degree C. for example) through the fuel cell system so as to regulate a temperature of the fuel cell system in the proper temperature range (about 80 through 85 degree C. for example).

The coolant may have certain conductivity for effective action of the fuel cell system, however, excessive conductivity leads to an electric leak via the coolant. Such a situation is undesirable to the fuel cell system. For reducing the conductivity, pure water is conventionally applied to the coolant. Recently, for prevention of freezing in a case of low temperature, utilization of a mixed solution containing glycol is proposed. 50% mixed solution in which ethylene glycol and pure water are evenly mixed ("EG50" hereinafter) can be exemplified as the mixed solution. A related art is disclosed in Japanese Patent Application Laid-open No. 2001-167782.

SUMMARY OF THE INVENTION

The utilization of EG50 to the coolant for the fuel cell often raises a problem that EG50 is easy to degrade according to the following oxidation reactions:

$$R(OH)_2 + nO_2 \rightarrow [R'CHO] \quad (1)$$

$$[R'CHO] + mO_2 \rightarrow R'CO_2H \quad (2)$$

where R and R' represent functional groups. $R'CO_2H$ as an oxidation reaction product is accumulated in the coolant and leads to degradation and a conductivity change of the coolant.

The coolant cannot include anticorrosives or antioxidants, which are known to be anti-degradation additives for radiators of engines, because they obstruct the fuel cell reaction. Prevention of coolant degradation without any additives is strongly desired.

The present invention is achieved in view of the above problem and is intended for providing a cooling system and a method, which effectively prevent degradation of coolant without any additives.

According to a first aspect of the present invention, a cooling system for a fuel cell system is provided with a circulation system including a circulation pump for circulating coolant, the coolant essentially consisting of water and glycol, a fuel cell connected to the circulation system so as to be cooled by the coolant, a heat exchanger connected to the circulation system so as to radiate heat from the coolant and a filter connected to the circulation system and configured to remove oxidation reaction product of the glycol from the coolant.

Preferably, the filter is a ruthenium supporting activated carbon filter. More preferably, the filter is provided with activated particles each supporting ruthenium. Further more preferably, the filter is provided with a pair of connection ports communicating with the circulation system, a tubular main body, a pair of mesh members made of stainless steel, the mesh members being respectively disposed at the both ends and the inside of the tubular main body, and activated carbon particles each supporting ruthenium. Still preferably, the filter is disposed upstream of the circulation pump.

According to a second aspect of the present invention, a cooling system for a fuel cell system is provided with a circulation system including a circulation pump for circulating coolant, the coolant essentially consisting of water and glycol, a fuel cell connected to the circulation system so as to be cooled by the coolant, a heat exchanger connected to the circulation system so as to radiate heat from the coolant and a gas injector connected to the circulation system and configured to inject inert-gas into the circulation system so as to purge the oxidation reaction product of the glycol from the coolant.

Preferably, the inert-gas is nitrogen gas. More preferably, the gas injector is disposed upstream of the circulation pump.

According to a third aspect of the present invention, a cooling method for a fuel cell system is provided with the steps of circulating coolant essentially consisting of water and glycol through a fuel cell, a heat exchanger and degradation prevention means and removing oxidation reaction product of the glycol from the coolant by the degradation prevention means.

Preferably, the removing step is filtering the oxidation reaction product. Alternatively preferably, the removing step is injecting inert-gas to the coolant so as to purge the oxidation reaction product from the coolant.

DETAILED DESCRIPTION OF THE PREFERRED EMBODIMENT

Figure 1:
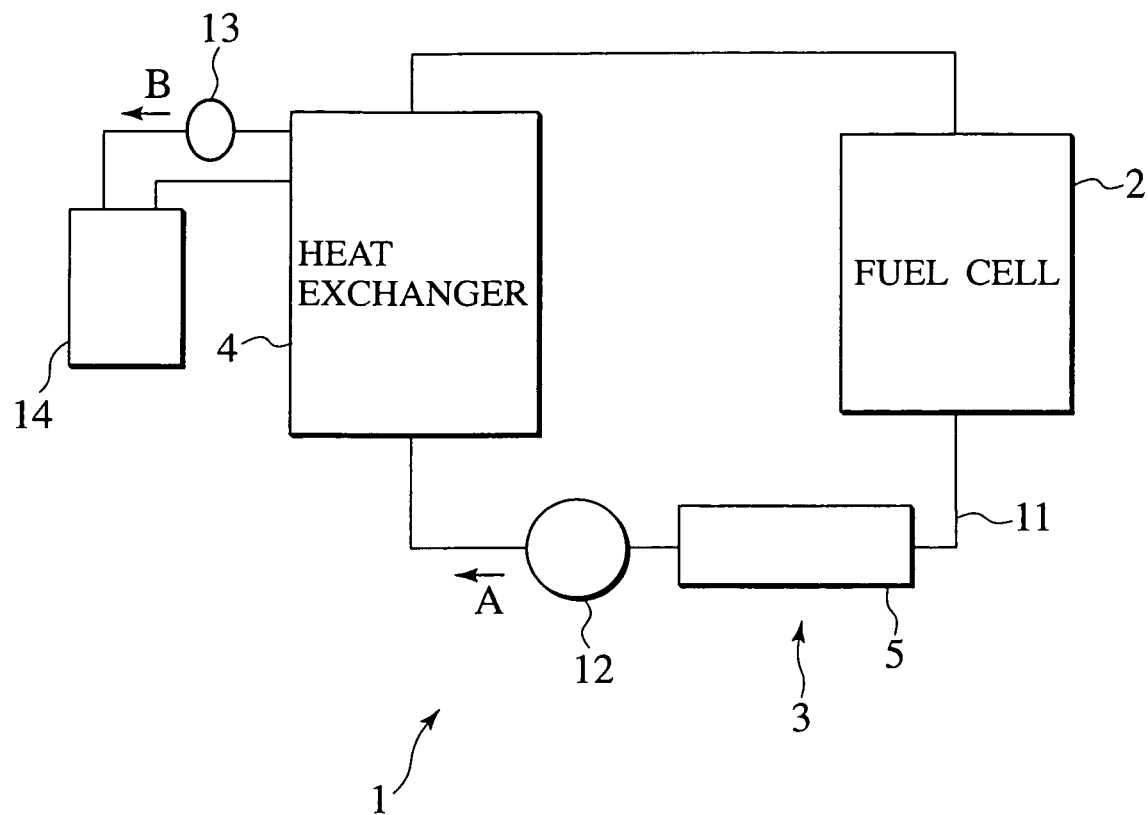
FIG. 1 is a block diagram of a cooling system according to a first embodiment of the present invention.
Figure 2:
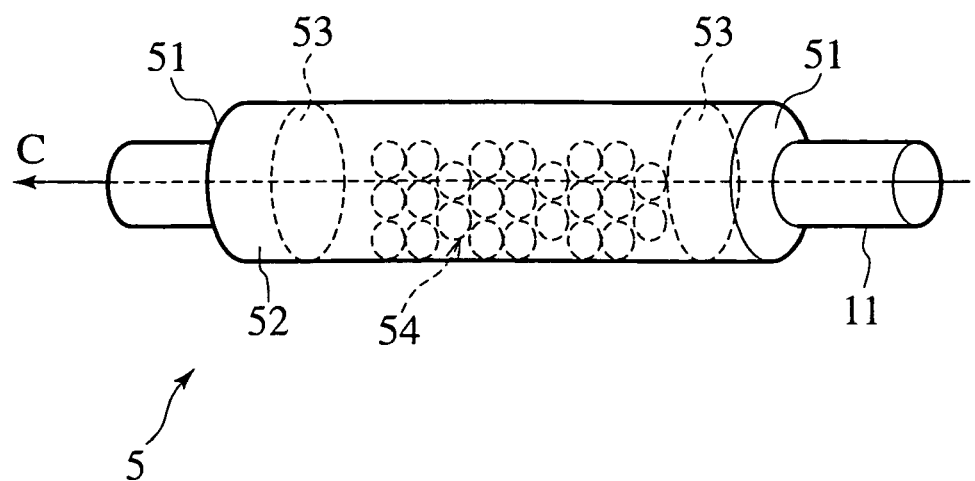
FIG. 2 is a schematic perspective view of a filter for the fuel cell system.

A first embodiment of the present invention will be described hereinafter with reference to FIGS. 1 and 2.

A cooling system 1 for a fuel cell 2 is provided with a circulation system 3 for circulating coolant through the fuel cell 2.

The circulation system 3 is provided with a circulation flow path 11, a filter 5, a heat exchanger 4 and a circulation pump 12, which communicate with each other. The filter 5 is disposed most upstream of them and provided with an activated carbon filter supporting ruthenium, details of which will be described later.

A reservoir tank 14 and a pressure valve 13 are connected to the heat exchanger 4. In a case where an amount of the coolant flowing through the circulation flow path 11 goes beyond a predetermined value, the pressure valve 13 is configured to be opened so as to feed the coolant to the reservoir tank 14 as indicated by an arrow B thereby the amount of the coolant is regulated.

Various arrangements may be applied to a configuration of the heat exchanger 4, however, a layered type heat exchanger having corrugated fins for a cooling system for a motor-vehicle internal combustion engine, details of which are disclosed in Japanese Patent Application Laid-open No. 2001-167782, can be preferably applied thereto.

EG50, in which ethylene glycol and pure water are evenly mixed as described above, is applied to the coolant.

The fuel cell 2 is of a proton exchange membrane ("PEM" hereinafter) type for example and composed of stacked plural unit fuel cells, for example 200 cells, each of which is provided with a membrane electrode assembly ("MEA" hereinafter), having cathodic and anodic electrodes and an electrolyte film put therebetween, and separators sandwiching the MEA. Each of the separators is provided with a flow path for circulating the coolant so as to properly regulate the temperature of the fuel cell 2.

A cooling cycle utilizing the cooling system 1 will be described hereinafter. When starting the cooling system 1, the circulation pump 12 of the circulation system 3 starts. Consequently, the coolant circulates through the circulation system 3 and absorbs heat from the fuel cell 2 so that the heat is transferred to and radiated from the heat exchanger 4.

The circulation system 3 is provided with a conventional thermoregulator (not shown) so as to regulate the temperature of the coolant supplied to the fuel cell 2 in a predetermined range (for example, from 65 to 75 degree C.).

A detailed description concerning with the filter 5, which is means for prevention of degradation of the coolant, will be given hereinafter with reference to FIG. 2.

The filter 5 is provided with a pair of connection ports 51 for communicating with the circulation flow path 11 and a tubular main body 52. Mesh members 53 made of stainless steel are respectively disposed at the both ends and the inside of the tubular main body 52. Activated carbon particles 54 each chemically supporting ruthenium are filled between the mesh members 53, through which the coolant flows as indicated by an arrow C.

Contaminants, particularly metallic ions, in the coolant should be reduced so as to prevent poisoning the protonating catalyst because the coolant has direct contact with the protonating catalyst in the cooling system 1. In order for reducing contamination, the circulation flow path 11, the heat exchanger 4 and constitutional elements thereof are made of corrosion resistant materials such as stainless steels, resins and resin coated metals so as to suppress ion-dissolution therefrom.

A degradation prevention cycle will be described hereinafter. When starting the cooling system 1, the circulation pump 12 of the circulation system 3 starts. Consequently, the coolant circulates through the filter 5 and then the filter 5 removes aldehyde R'CHO as an intermediate product of the aforementioned reaction (1) and hence prevents progress of the reaction (2) and degradation of the coolant.

According to the present embodiment of the invention, the filter 5 having the activated carbon particles supporting ruthenium is provided so as to remove the aldehyde, thereby the coolant is effectively prevented from degradation and conductivity change.

The mesh members 53 are made of stainless steel so that contamination of the coolant by dissolved metallic ion can be prevented.

Further, the filter 5 is disposed upstream of the circulation pump 12 so that the coolant is purified before flowing into the circulation pump 12 and flow resistance in the circulation flow path 11 is suppressed.

Furthermore, the cooling system 1 can be structured in such a simple constitution because only the filter 5 is added. Such a constitution can be added to any existing cooling system.

Figure 3:
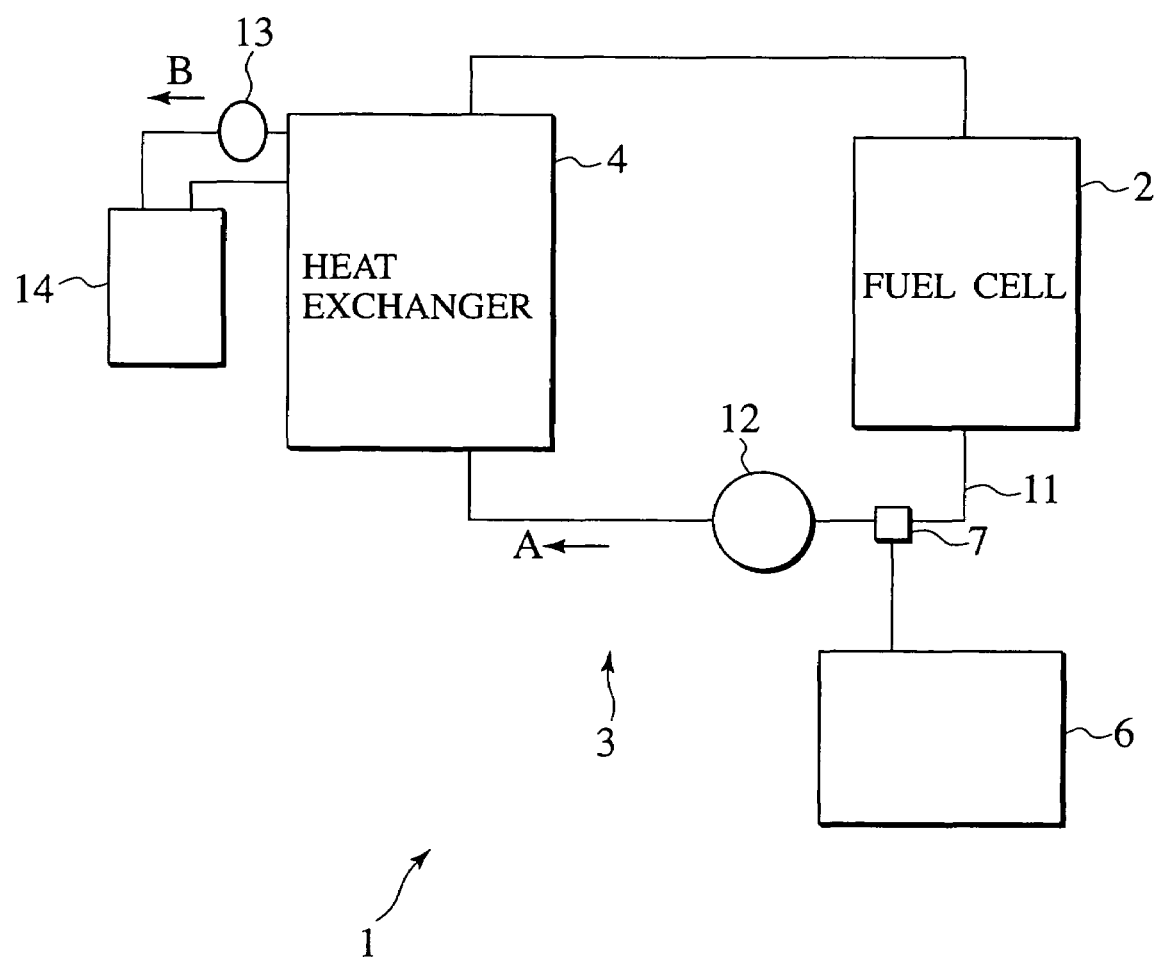
FIG. 3 is a block diagram of a cooling system according to a second embodiment of the present invention.

Next, a second embodiment of the present invention will be described hereinafter with reference to FIG. 3. In the below description, substantially the same elements as the aforementioned first embodiment are referenced with the same numerals and the detailed descriptions are omitted.

As means for prevention of degradation of the coolant, gas injection means for injecting inert-gas into the circulation system 3 is provided. As the inert-gas, nitrogen is preferably utilized, however, any inert gas can be also utilized.

Specifically, a gas injector 7 is connected upstream of the circulation pump 12 instead of the filter 5. A gas tank 6 pooling the inert gas is connected to the gas injector 7 so as to inject the inert gas into the circulation system 3 and hence purge the aldehyde from the coolant therein.

According to the present second embodiment, the same effect can be obtained as the aforementioned first embodiment.

Although the invention has been described above by reference to certain embodiments of the invention, the invention is not limited to the embodiments described above. Modifications and variations of the embodiments described above will occur to those skilled in the art, in light of the above teachings.

The contents of Japanese Patent Application No. 2003-090222 (filed Mar. 28, 2003) and Japanese Patent Application No. 2000-238097 (filed Aug. 7, 2000 and published Jun. 22, 2001 under Laid-open No. 2001-167782) are incorporated herein by reference in its entirety.

What is claimed is:

1. A cooling system for a fuel cell system comprising:
   a circulation system including a coolant consisting essentially of water and glycol and a circulation pump for circulating the coolant;
   a fuel cell connected to the circulation system so as to be cooled by the coolant;
   a heat exchanger connected to the circulation system so as to radiate heat from the coolant; and
   a filter connected to the circulation system and configured to remove an oxidation reaction product flowing with the coolant, the filter comprising ruthenium supported on activated carbon.

2. The cooling system of claim 1, wherein:
   the filter comprises a pair of connection ports communicating with the circulation system, a tubular main body, a pair of mesh members made of stainless steel, the mesh members being respectively disposed at the both ends and the inside of the tubular main body.

3. The cooling system of claim 1, wherein:

the filter is disposed upstream of the circulation pump.

4. A cooling method for a fuel cell system comprising the steps of:

circulating coolant consisting essentially of water and glycol through a fuel cell, and a heat exchanger; and removing oxidation reaction product of the glycol from the coolant by a filter including ruthenium supported on activated carbon.

* * * * *